(No Model.)

W. WIGHAM.
DRAFT EQUALIZER.

No. 514,105. Patented Feb. 6, 1894.

Witnesses:
J. M. Sherrod
E. G. Julihn

Inventor,
William Wigham,
By Joseph Leicester Atkins
Attorney

UNITED STATES PATENT OFFICE.

WILLIAM WIGHAM, OF ADRIAN, MINNESOTA.

DRAFT-EQUALIZER.

SPECIFICATION forming part of Letters Patent No. 514,105, dated February 6, 1894.

Application filed April 20, 1893. Serial No. 471,106. (No model.)

*To all whom it may concern:*

Be it known that I, WILLIAM WIGHAM, of Adrian, in the county of Nobles, State of Minnesota, have invented certain new and useful Improvements in Draft-Equalizers, of which the following is a specification, reference being had to the accompanying drawings.

The object of my invention is to produce an improved draft equalizer which may be manufactured at comparatively small cost, and which is simple and effective in operation.

Figure 1:
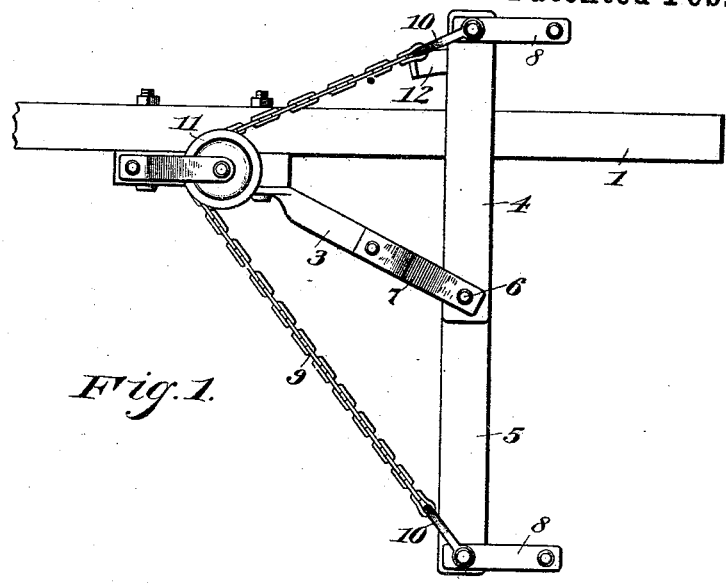
Figure 2:
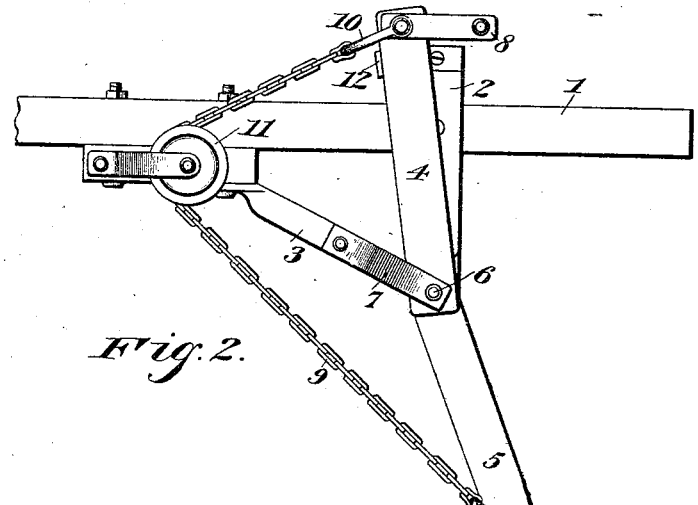
Figure 3:
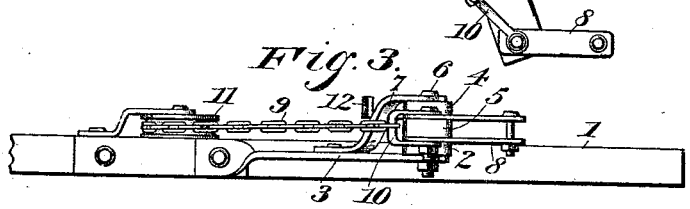
Figure 4:

In the accompanying drawings: Figure 1 is a top plan view of my equalizer, showing the arms in a certain position. Fig. 2 is a similar view, showing them in another position. Fig. 3 is a side elevation of my equalizer. Fig. 4 is a front elevation thereof.

Referring to the figures on the drawings: 1 indicates a section of a pole or tongue, and 2 an arm fixed thereto and preferably held rigidly in position by a brace 3.

4 and 5 indicate pivot arms preferably of the same length and pivoted, as indicated at 6, to the end of the arm 2 and to one side of the pole 1. A bracket 7 springing from the brace 3 is preferably employed to hold the pivot ends of the arms 4 and 5 more securely in their respective positions.

8 indicates horse attaching devices secured, respectively, to the ends of the arms 4 and 5.

9 indicates a flexible band, as for example, a chain, pivotally secured as by clevises 10 to the extremities of the arms 4 and 5.

11 indicates a pulley fastened to the rear end of the pole 1 and out of line of the pivot part 6 so as to bring it nearer to the free end of the arm 4 than the free end of the arm 5. The chain 9 passes around this pulley and serves to distribute and equalize the draft upon the respective arms.

12 indicates a stop bracket secured to the end of a fixed arm 2 in proximity to the free end of the arm 4. It is designed to limit directly the backward movement of the arm 4 and indirectly that of the arm 5 that is connected to the arm 4 by the chain 9. The effect of the location of the pulley 11 is to increase the power of a draft upon the arm 4 and thereby to equalize greater power applied to the end of the arm 5. The arm should be so constructed and the location of the pulley so adjusted that drafts upon the respective arms will keep them nearly vertical with the pole, but in case the power on the arm 5 should overcome that on the arm 4, the bracket arm 12 will serve to prevent the greater rotation of the arms upon their pivots.

What I claim is—

1. The combination with a pole and arm fixed at right angles thereto and extending upon both sides thereof, of arms terminally pivoted at one extremity of the fixed arm, a pulley, a flexible band secured to the free ends of the pivoted arms and passing around the pulley, and a stop upon the fixed arm to limit the motion of one of the pivoted arms, substantially as and for the purpose specified.

2. The combination with a pole and arm fixed at right angles thereto, of arms of equal length terminally pivoted upon the extremity of the fixed arm, a pulley located behind and out of line with the pivot of the arms and contiguous to the pole, and a flexible band connecting the free ends of the pivoted arms and passing around the pulley, substantially as specified.

In testimony of all which I have hereunto subscribed my name.

WILLIAM WIGHAM.

Witnesses:
C. M. CARY,
M. T. O'BRIEN.